(12) United States Patent
Avny et al.

(10) Patent No.: US 8,919,520 B2
(45) Date of Patent: Dec. 30, 2014

(54) TRANSMISSION WITH DURABILITY ENHANCEMENT TECHNIQUES

(75) Inventors: Eli Avny, Ypsilanti, MI (US); Matthew John Shelton, Grosse Ile, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 922 days.

(21) Appl. No.: 12/896,877

(22) Filed: Oct. 2, 2010

(65) Prior Publication Data

US 2011/0024258 A1 Feb. 3, 2011

Related U.S. Application Data

(63) Continuation-in-part of application No. 12/265,283, filed on Nov. 5, 2008, now Pat. No. 8,062,178.

(51) Int. Cl.
*F16D 13/72* (2006.01)

(52) U.S. Cl.
CPC ............ *F16D 13/72* (2013.01); *F16D 2300/02* (2013.01); *F16D 2300/18* (2013.01)
USPC ............... 192/113.26; 192/113.23; 192/70.12

(58) Field of Classification Search
USPC ............... 192/113.23, 113.26, 113.2, 113.22, 192/113.24, 113.25; 188/264 A
See application file for complete search history.

(56) References Cited

U.S. PATENT DOCUMENTS

| | | | |
|---|---|---|---|
| 1,024,737 A | 4/1912 | Miller | |
| 1,742,804 A * | 1/1930 | Carhart | 192/113.23 |
| 2,198,792 A | 4/1940 | Schjolin | |
| 2,205,629 A * | 6/1940 | Peterson | 192/113.23 |
| 2,310,203 A | 2/1943 | Banker | |
| 2,777,965 A | 1/1957 | Winther | |
| 3,007,561 A | 11/1961 | Harting | |
| 3,171,527 A | 3/1965 | Ott | |
| 3,251,437 A * | 5/1966 | Moyer et al. | 188/264 AA |
| 3,298,476 A * | 1/1967 | Day | 188/218 A |
| 3,335,834 A | 8/1967 | Wach | |
| 3,661,238 A | 5/1972 | Davies | |
| 3,664,467 A * | 5/1972 | Lucien et al. | 188/71.6 |
| 4,020,937 A | 5/1977 | Winter | |
| 4,294,343 A | 10/1981 | Reh | |
| 4,361,217 A * | 11/1982 | Bieber et al. | 192/103 FA |
| 4,382,497 A | 5/1983 | Sakai et al. | |
| 4,561,522 A | 12/1985 | Dayen | |
| 4,657,128 A | 4/1987 | Fujito et al. | |
| 4,712,656 A * | 12/1987 | Courtois | 188/218 XL |
| 4,721,195 A | 1/1988 | Majima | |

(Continued)

FOREIGN PATENT DOCUMENTS

| | | |
|---|---|---|
| CN | 1920318 | 9/2006 |
| GB | 2097873 | 11/1982 |

(Continued)

*Primary Examiner* — Troy Chambers
*Assistant Examiner* — Ryan Dodd
(74) *Attorney, Agent, or Firm* — James Dottavio; MacMillan, Sobanski & Todd, LLC (57) ABSTRACT

The present disclosure relates to durability enhancement techniques for a dry-clutch vehicle transmission. A cooling system that provides a direct convective cooling path to friction surfaces is disclosed. Also disclosed is a continuously variable clutch wear compensation assembly configured to adjust the position of clutch assembly components on-demand or as needed.

7 Claims, 7 Drawing Sheets

(56) References Cited

U.S. PATENT DOCUMENTS

| | | |
|---|---|---|
| 4,846,315 A | 7/1989 | Dayen |
| 4,923,043 A | 5/1990 | Okuno |
| 5,072,816 A | 12/1991 | Takeuchi et al. |
| 5,427,212 A * | 6/1995 | Shimazu et al. ......... 188/218 XL |
| 5,626,211 A * | 5/1997 | Gewelber et al. ........ 188/218 XL |
| 5,638,932 A | 6/1997 | Mikukami |
| 5,722,524 A * | 3/1998 | Mizukami et al. ......... 192/70.12 |
| 5,732,808 A | 3/1998 | Viola et al. |
| 5,845,757 A | 12/1998 | Csonka |
| 5,857,547 A | 1/1999 | Dequesnes |
| 5,904,234 A | 5/1999 | Kosumi et al. |
| 5,996,757 A | 12/1999 | Hofmann et al. |
| 6,035,986 A * | 3/2000 | Hofmann et al. .......... 192/70.12 |
| 6,129,191 A | 10/2000 | Kummer et al. |
| 6,145,633 A | 11/2000 | Niederstadt et al. |
| 6,151,766 A | 11/2000 | Everett |
| 6,260,669 B1 * | 7/2001 | Daudi ........................ 188/71.6 |
| 6,279,709 B1 | 8/2001 | Orlamunder |
| 6,293,370 B1 | 9/2001 | McCann et al. |
| 6,352,147 B1 * | 3/2002 | Orlamunder et al. ..... 192/107 R |
| 6,482,123 B2 | 11/2002 | Steeby |
| 6,520,136 B2 | 2/2003 | Ito et al. |
| 6,568,518 B2 | 5/2003 | Sarar |
| 6,695,743 B2 | 2/2004 | Tanaka et al. |
| 6,715,597 B1 | 4/2004 | Buchanan et al. |
| 6,745,884 B2 | 6/2004 | Hick et al. |
| 6,823,975 B2 | 11/2004 | Martin |
| 7,063,196 B2 | 6/2006 | Wakabayashi et al. |
| 7,314,429 B2 | 1/2008 | Reibold et al. |
| 7,380,645 B1 | 6/2008 | Ruiz |
| 8,062,178 B2 * | 11/2011 | Avny et al. ..................... 477/98 |
| 2001/0025759 A1 | 10/2001 | Sarar |
| 2002/0088288 A1 | 7/2002 | Bowen |
| 2003/0036457 A1 | 2/2003 | Wu et al. |
| 2005/0126877 A1 | 6/2005 | Schneider et al. |
| 2006/0060443 A1 * | 3/2006 | Smith et al. ................. 192/58.4 |
| 2009/0000557 A1 | 1/2009 | Takahashi et al. |
| 2009/0101312 A1 | 4/2009 | Gooden et al. |
| 2009/0152055 A1 | 6/2009 | Cox |
| 2009/0314591 A1 | 12/2009 | Suppiah |
| 2010/0113216 A1 | 5/2010 | Avny et al. |

FOREIGN PATENT DOCUMENTS

| | | |
|---|---|---|
| JP | 59013129 | 1/1984 |
| JP | 59067144 A | 4/1984 |
| JP | 59067144 A | 4/1984 |
| JP | 61235219 | 10/1986 |
| JP | 62132038 | 6/1987 |
| JP | 03189419 | 8/1991 |
| JP | 04029622 | 1/1992 |
| JP | 05106642 | 4/1993 |
| JP | 07310755 | 11/1995 |
| JP | 11254981 | 9/1999 |
| JP | 2002364362 | 12/2002 |
| JP | 2004360460 | 12/2004 |
| JP | 2005003134 | 1/2005 |
| JP | 2006283872 | 10/2006 |

* cited by examiner

TRANSMISSION WITH DURABILITY ENHANCEMENT TECHNIQUES

CROSS-REFERENCE TO RELATED APPLICATIONS

This application is a continuation-in-part and claims the benefit of U.S. Non-Provisional patent application Ser. No. 12/265,283 titled "Temperature Control of Dual Input Clutch Transmission" filed Nov. 5, 2008, now U.S. Pat. No. 8,062,178 which is hereby incorporated by reference in its entirety.

TECHNICAL FIELD

The present disclosure relates to durability enhancement techniques for a dry-clutch vehicle transmission.

BACKGROUND

Conventional vehicle transmissions predominantly employ wet clutches to accomplish gear shifting. Transmissions typically include a transmission fluid which is recycled throughout the transmission. Wet clutches generally provide greater heat transfer and temperature control than dry clutches. Wet clutches also, however, have a lower coefficient of friction than dry clutches. Wet clutches are further known to slip pre-engagement as wet clutches have a lower coefficient of friction.

Dry clutches tend to provide higher coefficients of friction than wet clutches. Dry clutches can provide lower costs and complexity. Still, dry clutches can have thermal management and durability issues. Some powershift dry dual-clutch transmissions (or "DCTs") comprise a manual clutch construction, e.g., as disclosed in U.S. Patent Publication No. 2010/0113216 titled "Temperature Control of Dual Input Clutch Transmission." Two clutches are utilized to provide functionality closer to that of an automatic transmission clutch vehicle launch. Temperature can significantly impact the length of service life of a transmission in which each input clutch is a dry clutch. A friction surface—the primary source of heat for the transmission—is surrounded by material and lacks a direct convection path for cooling. The transmission has heavy components with high inertia and low heat dissipation. Though the use of a controlled fan can improve cooling in the transmission, the indirect air flow path from the fan to the heat source slows down the cooling process.

Another common issue in dry-clutch transmissions is that clutch wear can be significantly increased by high operating temperatures. Repetitive engagement of clutch components can cause wear on the friction plate. This wear can decrease clutch lifespan. Some existing transmissions have a clutch adjustment mechanism that iteratively adjusts the position of the pressure plate when the clutch becomes slow to engage. Once a maximum distance for clutch engagement is detected the system moves clutch components into a tighter relative position. Since the adjustment is stepwise, the system repetitively over- and under-adjusts both after adjustment and before re-adjustment, respectively. A more efficient method of clutch adjustment is desired. Additionally, a more robust and reversible design is preferred.

Therefore, it is desirable to have a dry-clutch transmission with improved durability and wear reduction techniques. Cooling techniques which provide a more direct convection and conductive path are needed to reduce overheating in the transmission. Moreover, a continuously variable clutch wear compensation assembly is desirable to have a more flexible yet, effective and robust clutch wear adjustment mechanism.

SUMMARY

The present invention addresses at least one or more of the above-mentioned issues. Other features and/or advantages may become apparent from the description which follows.

Certain embodiments of the present invention relate to a dry-clutch transmission, having: a clutch assembly; and a cooling system, including: a hub onto which the clutch assembly is journaled, the hub having a plurality of apertures directed toward friction surfaces in the clutch assembly; a fan configured to direct air through the hub; and a controller configured to control the fan according to a clutch temperature.

Another exemplary embodiment of the present invention relates to a dry-clutch transmission, including: a clutch assembly; and a divider plate included in the clutch assembly having a plurality of airfoil ribs formed on a surface of the plate. A leading edge of at least one of the airfoil ribs is aligned within 60 degrees of a relative vector equal to the sum of an air speed vector and a clutch speed vector.

Another exemplary embodiment of the present invention relates to a dry-clutch transmission, with: a clutch assembly having a pressure plate; and a clutch compensation assembly including: an electric motor; a cam interface between the pressure plate and motor, the motor configured to move the cam interface; and a controller configured to control the electric motor.

Another exemplary embodiment of the present invention relates to a clutch compensation assembly, having: an actuator configured to continuously adjust the position of a clutch pressure plate on an as-needed basis.

Yet another exemplary embodiment of the present invention relates to a transmission control unit, having: fan control logic configured to control a fan according to an inferred clutch temperature; and clutch wear compensation logic configured to adjust clutch pressure plate position according to a clutch actuation condition.

One advantage of the present disclosure is that it teaches cooling techniques that force flow close to the friction surface—a primary source of heat for the transmission—in order to reduce temperature response time to heat events. In some embodiments, the hub includes nozzles of various sizes to force more air towards hotter plates (e.g., friction plates located in the middle of the clutch pack).

Another advantage of the present disclosure is that it teaches a cooling system having inlet and outlet air thermostats giving feedback for software error reduction (such as inferred temperatures) and thermal model reset. This information yields improved shift and launch feel for better clutch torque accuracy through reduced coefficient of friction variation and avoidance of higher temperature levels.

Another advantage of the present teachings is that they enable a dry-clutch transmission to run a longer cooling duty cycle than cooling oil. The cooling duty cycle is improved because the fan is used on-demand which can increase energy and fuel efficiency.

Another advantage of the present disclosure is that it teaches the use of spacers shaped like airfoils aligned with relative air velocity to assist flow thus further contributing to clutch cooling.

Yet another benefit of the present disclosure is that the continuously variable, electric wear adjustment assemblies taught are more robust than a mechanical or iterative system. Moreover the continuously variable system is reversible for error correction enabling better clutch torque accuracy and efficiency during engagement.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings wherein like characters represent the same or corresponding parts throughout the several views there are shown various exemplary systems for reducing transmission wear and enhancing transmission durability. The systems are best appreciated in a powershift dry dual-clutch transmissions (or "DCTs") where cooling and wear can be significant issues for the transmission. Though the illustrated examples regard powershift DCTs, the present teachings can be implemented on different kinds of vehicle transmissions including, but not limited to, single-clutch manual transmissions, automatic transmissions, or wet-clutch transmissions. A cooling system is provided that enables a more direct cooling path to the clutch surface thus improving fan efficiency and reducing cooling response time. The fan helps in achieving a more concentrated, forced flow improving heat transfer. This is accomplished, in part, by running the air as close as possible to the heat source (i.e., the friction surfaces in the clutch assembly). The fan is linked to a controller that is responsive to transmission temperatures. Multiple thermocouples are dispersed throughout the transmission to give feedback to the fan controller as to the thermal conditions of the transmission during operation.

Some of the disclosed techniques also improve transmission durability through the implementation of a continuously variable clutch compensation assembly. Instead of iterative adjustments of clutch components, the system continuously adjusts clutch components as-needed. Adjustments are reversible.

Figure 1:
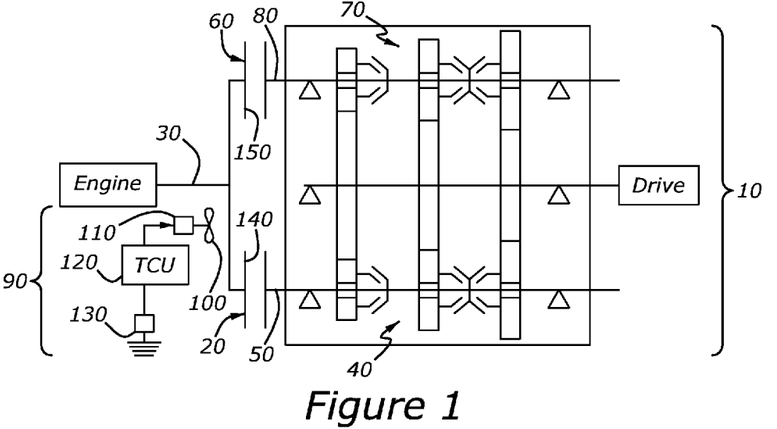
FIG. 1 is a schematic depiction of a dry-clutch vehicle transmission.

Referring now to FIG. 1, there is shown therein a schematic depiction of a vehicle transmission 10. The transmission 10 is a dual dry-clutch powershift transmission having a first dry input clutch assembly 20 that selectively connects an input 30 of transmission 10 to gears in set 40 associated with a first layshaft 50 and a second dry input clutch assembly 60. The second dry input clutch assembly 60 selectively connects to the gears in set 70 associated with a second layshaft 80. In the illustrated embodiment, input 30 is driveably connected to a power source such as an internal combustion engine or an electric motor. An electronic transmission control unit (or "TCU") controls the input clutch assemblies 20, 60 through command signals sent to an electric motor that actuates the input clutches. Different gear ratios can be accomplished through the manipulation of the dual input clutches and gear selection actuators. An output shaft is connected to a vehicle driveline to effectuate the different modes of operation or shift gears for the transmission. The two input clutch assemblies 20, 60 provide functionality similar to that of an automatic transmission. The transmission can see higher temperatures since each input clutch assembly 20, 60 is a dry clutch.

The transmission 10, of FIG. 1, includes a cooling system 90. The cooling system 90 includes a motor-driven fan 100. Fan is connected to a motor 110 that is controlled by the transmission control unit 120. The control unit 120 selectively supplies power to the fan motor 110 to increase or decrease fan speed. Fan speed can be decreased to zero or adjusted to rotate in a different direction than the default direction. When the fan 100 is operated in an opposing direction the fan is said to have a negative speed. The TCU 120 is linked to an electrical power source 130 (e.g., the vehicle battery or a fuel cell). Fan 100 is positioned so as to provide air more directly onto the friction surfaces of the input clutch assemblies 20 and 60 (as discussed in detail with respect to FIGS. 2 and 3) through apertures in a hub onto which the clutches are journaled. In this manner, fan 100 is in direct fluid communication with input clutch surface 140 and input clutch surface 150.

Figure 2:
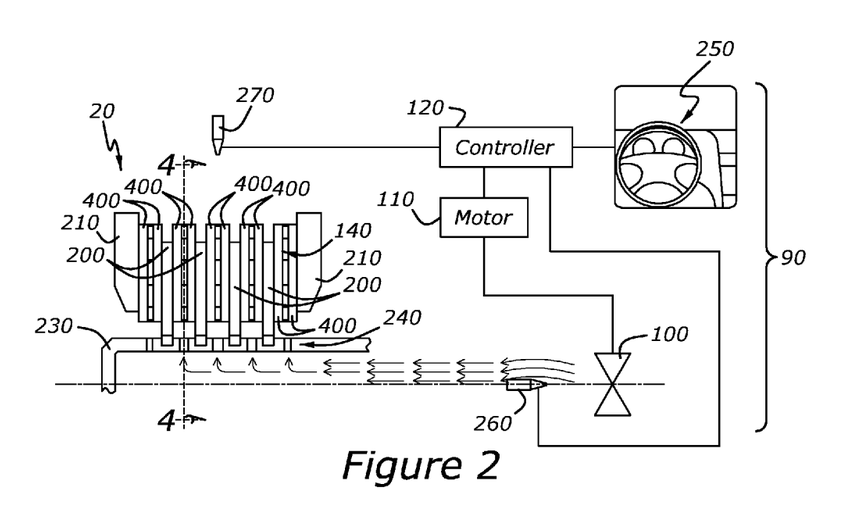
FIG. 2 is a side view of a transmission clutch assembly with an exemplary cooling system.
Figure 3:
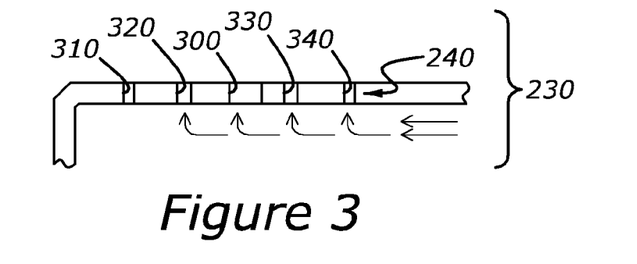
FIG. 3 is a cross-sectional view of a hub in the clutch assembly of FIG. 2.

Now with reference to FIGS. 2 and 3, there is shown therein a side view of the input clutch assembly 20 with the cooling system 90 of FIG. 1. The clutch assembly 20 shown includes a series of friction plates 200 sandwiched between two pressure plates 210 (or drive plates). Each friction plate 200 has at least one friction surface (e.g., 140) that enables collective engagement when a clutch actuator applies pressure to the pressure plate(s). Friction surfaces are the primary source of heat during transmission operation, especially during launch.

Clutch assembly 20, as shown in FIG. 2, is journaled onto a hub 230. Hub 230 is configured to be concentric with an input shaft (e.g. layshaft 50 as shown in FIG. 1). Hub 230 includes a plurality of radial apertures 240 interspersed between clutch assembly components. In this embodiment, the apertures 240 are aligned with the friction surfaces of the friction plates. Fan 100 is in direct fluid communication with clutch surfaces. A fluid path is defined in the hub 230. Air is directed through the interior of hub 230, out of apertures 240 and directly onto friction surfaces. Air flows out of the outer diameter of the clutch assembly 20 and exhausted out of the transmission housing.

Fan speed can be increased and decreased according to predetermined conditions. Fan 100 is linked to the electric motor 110 and controller 120 as shown in FIGS. 1 and 2. Controller 120 is configured to selectively control the fan 100 according to a measured or inferred clutch temperature. Controller 120 sends a warning signal to a user interface 250 if the measured or inferred clutch temperatures exceed a predetermined threshold. In one embodiment, the threshold is 300 degrees Celsius.

Two thermocouples 260 and 270 are positioned in the transmission, as shown in FIG. 2. Thermocouples 260, 270 are hard-wired or linked to controller 120. Thermocouples 260, 270 provide temperature readings at various locations in the transmission. In this embodiment, thermocouple 260 is positioned upstream of the clutch assembly 20. Thermocouple 260 is configured to read the temperature of air entering the hub 230 and clutch assembly 20. Thermocouple 270 is positioned at the outer diameter of the clutch assembly 20 and is configured to take temperature readings at the outlet of the clutch assembly. Thermocouples 260, 270—positioned in air inlet and discharge, respectively—can produce data used for the following purposes: 1) performing temperature integration (exposure) for quantifying usage severity; 2) improving thermal model accuracy by monitoring error and resetting if needed; and 3) detecting insufficient air flow rates. Controller 120 is programmed with predetermined clutch temperature thresholds for increasing and decreasing fan speed. Controller 120 includes fan control logic configured to control the fan according to an inferred or measured clutch temperature (as is discussed in more detail herein below with respect to FIG. 13).

The cooling system 90, as particularly shown in FIG. 3, includes differently sized apertures 240 in the hub 230 on which the clutch assembly is journaled onto. Hub 230 includes five apertures. Aperture 300 is sized larger than apertures 310, 320, 330 and 340. Aperture 300 enables more flow to reach the center of the clutch assembly 20, where higher temperatures are experienced. Apertures 310 and 340 are smaller than apertures 300, 320 and 330. Each aperture 300, 310, 320, 330 and 340 (or nozzle) has an axial dimension—in the longitudinal direction of the hub—and a radial dimension, perpendicular to the axial direction. Each aperture 300, 310, 320, 330 and 340 is an arc-shaped slot formed in the body of hub. Apertures 300, 310, 320, 330 and 340 can also have varying lengths to yield different cooling effects on the clutch assembly. Apertures can be, for example, die cast, machined or stamped out of the hub 230. In one embodiment, the mold for hub 230 includes protrusions to create apertures in shell of the hub. Hub 230 can be any stationary or rotating transmission component. Hub can be splined onto an input shaft, output shaft or hub can represent the input/output shafts. In another embodiment, hub 230 partially encases the clutch assembly so that hub is at the outer diameter of the clutch assembly. Air is passed through the hub and onto the outer diameter of the clutch assembly.

Figure 4:
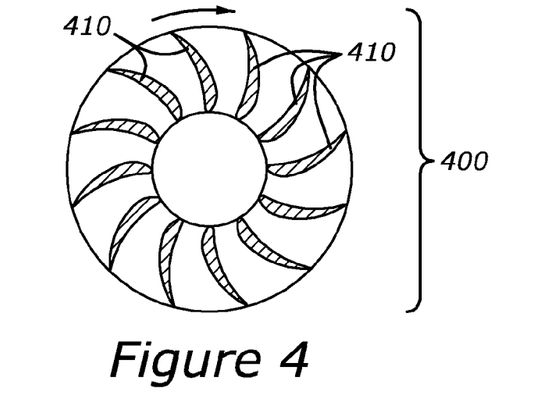
FIG. 4 is a front view of a divider plate in the clutch assembly of FIG. 2.
Figure 5:
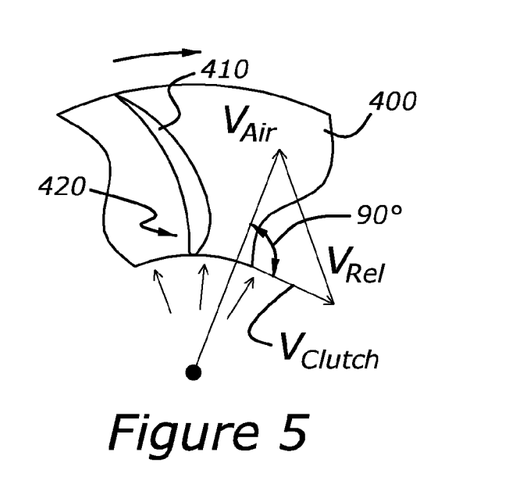
FIG. 5 is a partial cut-away of the divider plate of FIG. 4.

The clutch assembly 20 further includes a series of separator or divider plates 400, as shown in FIGS. 4 and 5. Divider plate 400 includes airfoil ribs 410 that also improve air flow from the inner diameter of the transmission to the outer diameter of the transmission. In this manner, greater cooling is achieved. In FIGS. 4 and 5, the separator or divider plate 400 of FIG. 2 is shown from line 4-4. In order to assist rotation and facilitate flow, the separating surfaces of the plate 400 are shaped with an airfoil. The front view of divider plate 400 illustrates airfoil ribs 410 formed on the face of the plate. As shown in FIG. 5, airfoil ribs 410 are particularly positioned with respect to the rotational momentum of the clutch and the direction of airflow, from the inner diameter of the clutch to the outer diameter of the clutch. Airfoil ribs 410 decrease the resistance to air flow while the divider plate is rotating. The air entering the clutch assembly is directed radially outward from the clutch assembly. The air flow defines an air speed vector ($V_{Air}$) in line with the radius of the divider plate. The rotation of the clutch also defines a vector by which the components on the face of the divider plate travel. The clutch speed vector ($V_{Clutch}$) in this embodiment is normal to the air speed vector. Airfoil ribs 410 are positioned so that the leading edge of the airfoil rib 420 is aligned with a relative vector ($V_{Rel}$) equal to the sum of the air speed vector and clutch speed vector. In the illustrated embodiment, the relative vector $V_{Rel}$ is approximately 45 degrees from $V_{Clutch}$. In another embodiment, the leading edge of the airfoil rib 420 is positioned 15 degrees from the relative vector. The leading edge of the airfoil rib 420 can be positioned within +/−60 degrees of the relative vector, $V_{Rel}$. The relative vector can be larger or smaller depending on the air flow path and direction of clutch rotation.

Figure 6:
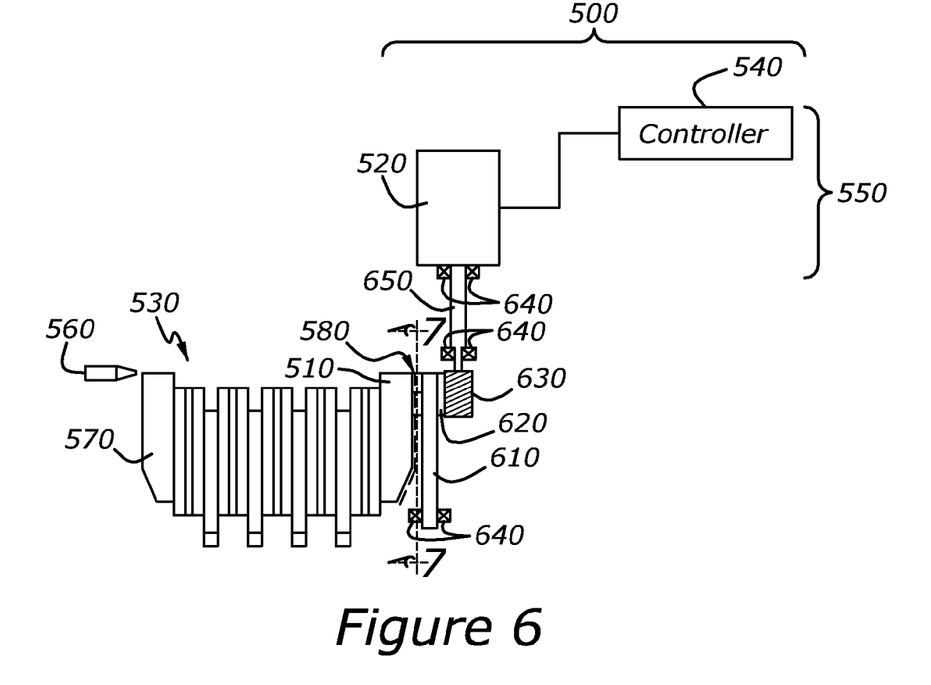
FIG. 6 is a side view of a clutch wear compensation assembly according to an exemplary embodiment of the present invention(s).
Figure 7:
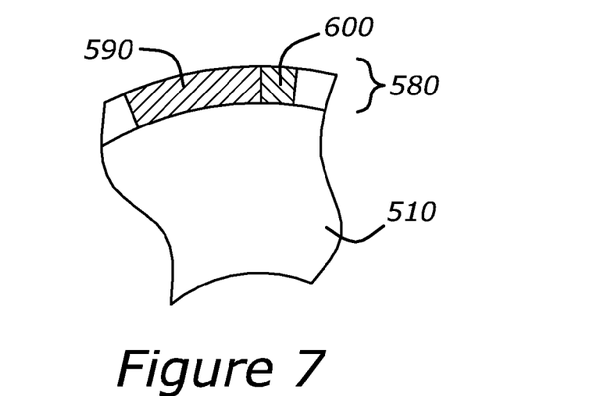
FIG. 7 is a cross-sectional view of a cam interface in the clutch wear compensation assembly of FIG. 6 through line 7-7.
Figure 8:
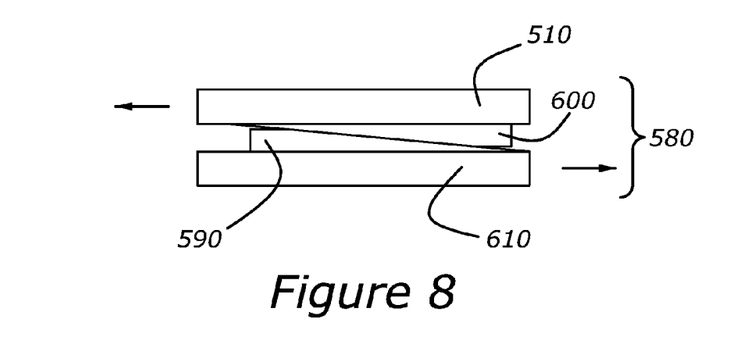
FIG. 8 is a top view of the cam interface of FIGS. 6 and 7.

Referring now to FIGS. 6 through 8, there is shown therein an exemplary continuously variable clutch wear compensation assembly 500. The clutch compensation assembly 500 is continuously variable in that the assembly can adjust the axial position of a pressure plate 510 in a manner directly proportional to the displacement caused by clutch wear. Compensation assembly 500 is electrically controlled by a servo motor 520 that provides power in either direction so that the clutch compensation assembly's adjustments are reversible. A clutch assembly 530 is shown in FIG. 6 with an exemplary clutch compensation assembly attached thereto. Motor 520 is linked to a controller 540 (e.g., the transmission control unit as discussed with respect to FIG. 1). The motor and controller act as an actuator 550 for the clutch compensation control assembly 500. Controller 540 is configured to control adjustment of the compensation assembly according to predetermined conditions. One predetermined condition is the distance to clutch engagement. The compensation assembly includes a position sensor 560 placed with respect to the clutch assembly 530. The compensation assembly 500 is configured to adjust the pressure plate 510 according to a clutch actuation condition. In this embodiment, the clutch actuation condition is distance to clutch engagement. Position sensor 560 detects how much displacement must occur in the clutch assembly 530 before the clutch is fully or substantially engaged. Position sensor 560 is shown linked to a second pressure plate 570. Position sensor 560 can also be placed in the inner diameter of the clutch assembly 530, at an end of the other pressure plate 510 or in another location. Position sensor 560, in this embodiment, is wirelessly connected to the controller 540. A clutch actuator (not shown) is used to move at least one of the two pressure plates 510, 570 together to cause engagement of the clutch.

The clutch compensation assembly 500, of FIG. 6, comprises a cam interface 580 that enables the assembly to continuously adjust the position of pressure plate 510. Cam interface 580 includes two matable, ramped surfaces having complementary angles—as also shown in FIGS. 7 and 8. Surface 590 is coupled to plate 610. On the opposite side of plate 610, a gear teeth 620 engages a gear 630 linked to the servo motor 520 (as shown in FIG. 6). Bushings 640 are included in this embodiment to facilitate the rotation of plate 610 and shaft 650 that extends between the motor 520 and gear 630. Mating surface 600 is coupled to pressure plate 510. As shown in FIG. 8, as plate 610 is rotated with respect to the inner diameter of the transmission, pressure plate 510 is moved axially forward with respect to the transmission. Each ramped surface 600, 590 is angled approximately 20 degrees from the pressure plate 510 and plate 610, respectively. In other embodiments, ramp surfaces can be angled at a greater or smaller angle.

Figure 9:
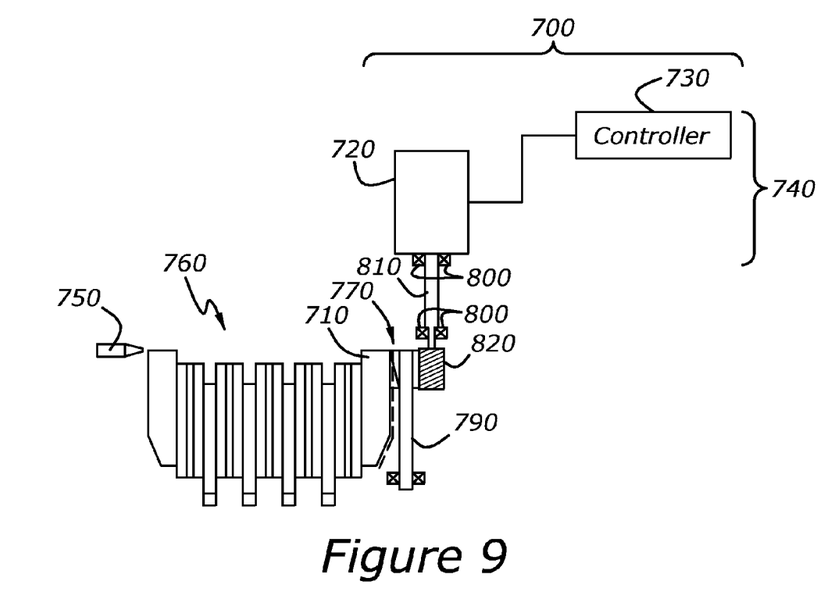
FIG. 9 is a side view of a clutch wear compensation assembly according to another exemplary embodiment of the present invention(s).
Figure 10:
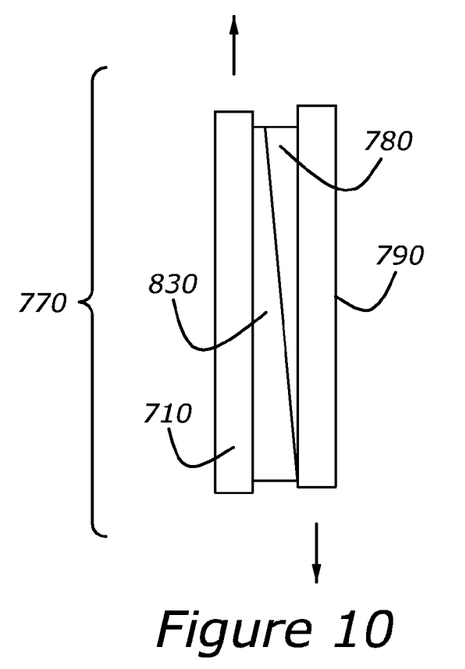
FIG. 10 is a top view of a cam interface in the clutch wear compensation assembly of FIG. 9.

Referring now to FIGS. 9 and 10, there is shown therein another exemplary continuously variable clutch wear compensation assembly 700. The clutch compensation assembly 700 is continuously variable in that the assembly can adjust the axial position of pressure plate 710 in a manner directly proportional to the displacement caused by clutch wear. Clutch compensation assembly 700 also includes an electric motor 720. The motor 720 is linked to a controller 730 (e.g., the transmission control unit as discussed with respect to FIG. 1). Controller 730 and motor 720 act as the actuator 740 for the clutch compensation assembly 700. Controller 730 is configured to control the adjustments of the compensation assembly according to distance to clutch engagement. The compensation assembly 700 includes a position sensor 750 placed with respect to a clutch assembly 760. The compensation assembly 700 is configured to adjust pressure plate position according to a clutch actuation condition.

The clutch compensation assembly 700, of FIG. 9, comprises a different cam interface than the previous embodiment. Cam interface 770 also enables the assembly to continuously adjust the position of pressure plate 710. Cam interface 770 includes two matable, ramped surfaces having complementary angles—as also shown in FIG. 10—that are radially angled with respect to the transmission. Surface 780 is coupled to plate 790. On the opposite side of plate 790, a pinion gear engages a worm gear linked to the servo motor (as shown in FIG. 9). Bushings 800 are included in this embodiment to facilitate the rotation of the shaft 810 that extends between the motor 720 and worm gear 820. Mating surface 830 is coupled to pressure plate 710. As shown in FIG. 8, as plate 790 is vertically mobile with respect to the inner diameter of the transmission, pressure plate 710 is moved axially forward with respect to the transmission when plate 790 is moved toward the transmission center. Each ramped surface 780, 830 is angled approximately 20 degrees from the plate 790 and pressure plate 710, respectively. In other embodiments, ramp surfaces are angled at a greater or smaller angle than shown.

While cam interfaces 580 and 770 are shown as two mating ramped surfaces, any number of cams can be incorporated in the clutch compensation assembly to enable continuous variation of clutch position. For example, in one embodiment, the pressure plate is configured with a pinion gear. A worm gear is coupled to an electric motor. The motor directly controls pressure plate position. Other cams including, for example, linkages and rotating cams can be married with the present teachings.

Figure 11:
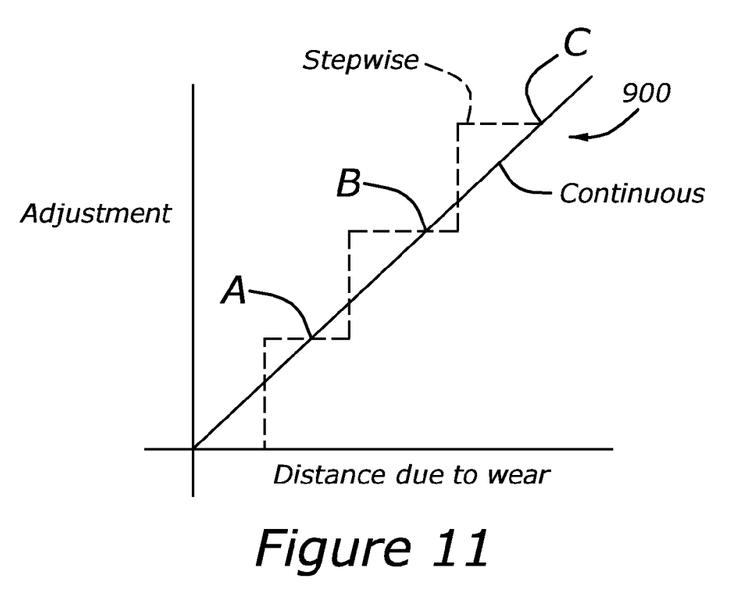
FIG. 11 is a graph of the adjustment logic of a clutch wear compensation assembly according to an exemplary embodiment of the present invention(s).

With reference to FIG. 11, the adjustment logic for the illustrated clutch compensation assemblies is shown. The graph 900 of FIG. 11 compares stepwise adjustment logic with continuously variable adjustment logic. The distance to clutch engagement, caused by transmission wear is shown on the X-axis. Clutch adjustment is shown on the Y-axis. In a stepwise arrangement, the adjustment logic only adjusts clutch position once a certain displacement threshold is met. In this embodiment, the stepwise adjustment logic moves the pressure plate a predetermined distance (e.g., 0.10 mm) closer to a second pressure plate for every additional 0.10 mm of increased clutch engagement distance due to wear. This causes over- and under-compensation. The stepwise adjustment logic only accurately meets the necessary adjustment demands at several instances A, B and C. When the threshold is unmet, inefficiencies occur. With the continuously variable adjustment logic, adjustments are made on-demand or on an as-needed basis. The controller is linked to the position sensor so that the clutch compensation assembly can adjust with the distance to engagement caused by wear. The adjustment distance is proportional (and can be set to be equal to) the distance caused by component wear.

Figure 12:
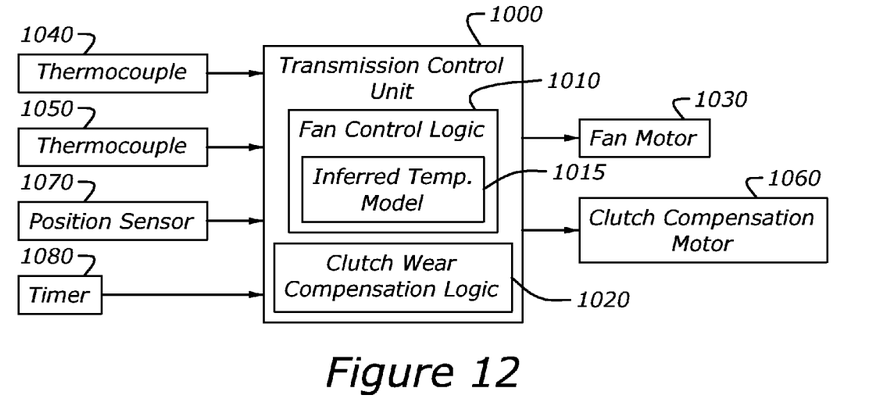
FIG. 12 is transmission control unit according to an exemplary embodiment of the present invention(s).
Figure 13:
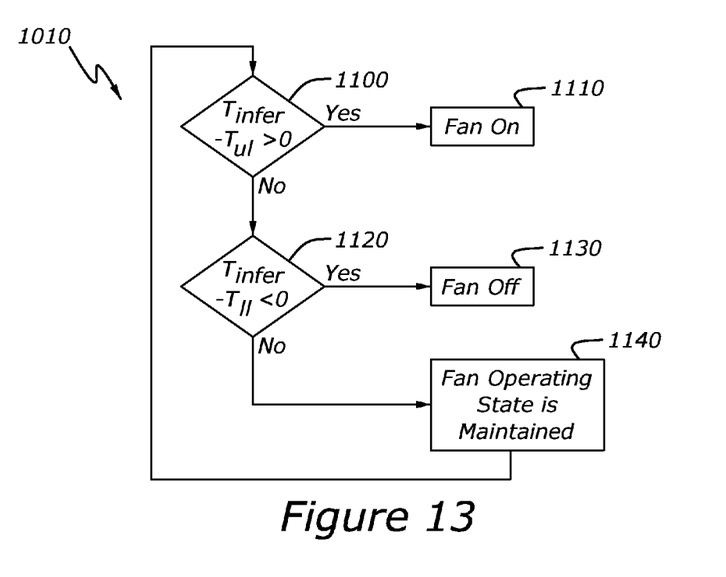
FIG. 13 illustrates an exemplary method of operating a transmission cooling fan.
Figure 14:
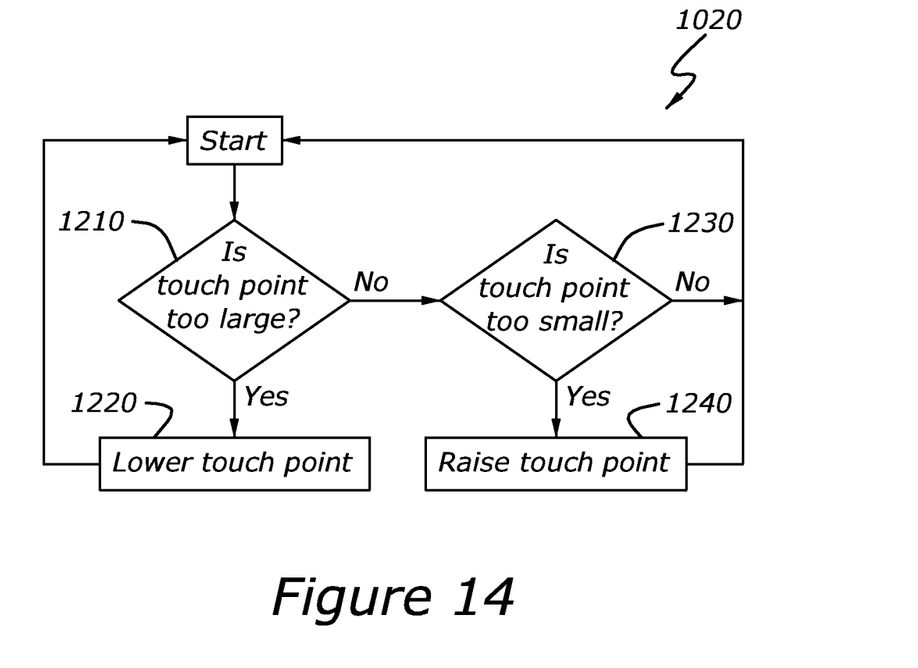
FIG. 14 illustrates an exemplary method of controlling a clutch compensation assembly for a vehicle transmission.

Referring now to FIGS. 12-14, there is disclosed a transmission controller or transmission control unit 1000 with software to execute some of the aforementioned techniques. The transmission control unit 1000, as shown in FIG. 12, includes fan control logic 1010 and clutch wear compensation logic 1020. Fan control logic 1010 is configured to govern the fan motor 1030 used to disperse air directly onto the face of the friction plates. Logic 1010 includes an inferred temperature model 1015 configured to infer clutch temperature based on inputs related to engine speed, clutch speed, engine torque and clutch torque. TCU 1000 is linked to two thermocouples 1040, 1050 positioned with respect to the transmission. Data from thermocouples 1040, 1050 can be process, as discussed below, in fan control logic 1010 to control fan operation. Clutch wear compensation logic 1020 is configured to control a clutch compensation motor 1060 to adjust a clutch pressure plate position according to a clutch actuation condition. The clutch actuation condition can be distance to clutch engagement or, for example, time to engagement. TCU 1000 is linked to a position sensor 1070 and timer 1080 to input data related to either clutch actuation condition as is discussed herein below.

In FIG. 13, the fan control logic 1010 of FIG. 12 is shown in more detail. FIG. 13 is an algorithm that controls operation of a fan motor. At step 1100 the software determines whether a difference between an inferred clutch temperature $T_{infer}$ and an upper limit or threshold $T_{upper}$ is greater than zero. If the inferred temperature is greater than the predetermined threshold fan speed is increased and the fan is turned on at step 1110. Next the software tests to see if the difference between the inferred temperature and a lower threshold is less than zero at step 1120. The lower threshold is the minimum temperature at which the fan is designated to operate. If the inferred temperature is less than $T_{min}$, fan speed is decreased and the fan is turned off at step 1130. If the inferred temperature is within the hysteresis range defined by the upper and lower thresholds the fan maintains its existing state of operation 1140. The algorithm 1010 is a closed loop system; after step 1140 the software returns to step 1100 and the program is re-executed.

Thermocouple readings can be used to infer clutch temperature for the controller or send warning signals when transmission temperatures exceed a predetermined threshold. The temperature difference between thermocouples can be used to detect the heat generated by clutch assembly. Moreover, the temperature of the critical clutch surfaces is inferred. Input information supplied to the TCU includes engine speed, engine torque, input clutch speed and input clutch torque. Temperature is inferred from the relative speed between the engine and clutch or clutch slip. The power distribution or energy transfer rate is derived from clutch slip and used to infer temperature as disclosed in U.S. Patent Publication No. 2010/0113216 titled "Temperature Control of Dual Input Clutch Transmission." Additional input information supplied to the TCU includes the specific heat of the clutches, the rate of heat convection from the clutches, and the weight and thermal conductivity of the clutches, the ambient temperature, coefficient of friction of the clutch surfaces, and initial temperature of the clutches. TCU is configured to process this data in order to calculate the rate of change of rotating power absorbed by the clutches. In another embodiment, measurements from the thermocouples are used to derive clutch temperature. The difference in temperature readings between two or more thermocouples (e.g., 260 and 270 as shown in FIG. 2) is used to calculate clutch heat dissipation.

Exemplary clutch wear compensation logic 1020, as shown in FIG. 14, is configured to adjust a clutch pressure plate position according to a clutch actuation condition—distance to clutch engagement. The clutch wear compensation logic 1020 first detects if the clutch is engaged. A position sensor takes a reading of the clutch displacement necessary for engagement. The touch point (or distance to clutch engagement) is compared to a predetermined threshold at 1210. If the distance to clutch engagement is greater than a predetermined threshold, the clutch compensation assembly is activated at 1220. Clutch wear compensation is adjusted to lower the pressure plate touch point. The cam interface is adjusted to an offset that is less than or equal to the clutch engagement offset at 1220. If the distance to clutch engagement is not above the predetermined threshold, the algorithm continues to step 1230. If the touch point is too small, the algorithm continues to adjust the clutch wear compensation to raise the touch point at step 1240. The algorithm 1020 is a closed loop system as well; after steps 1220 and 1240 the software returns to start and the program is re-executed. In this manner, if either adjustment steps 1220 or 1240 result in an excessive compensation, the system reverses the adjustment and corrects itself.

Other clutch actuation conditions can be programmed into the logic of FIG. 14. For example, audible detectors, torque sensors, and weight or inertia sensors data can be input into the TCU to govern the clutch compensation assembly.

It will be apparent to those skilled in the art that various modifications and variations can be made to the methodologies of the present invention without departing from the scope its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A dry-clutch transmission, comprising:
a clutch assembly;
a cooling system, including:
 a hub onto which the clutch assembly is journaled, the hub having apertures directed toward friction surfaces in the clutch assembly, the apertures being larger at a center than at opposite ends of the clutch assembly;
 a fan configured to direct air through the hub; and
 a controller configured to control the fan according to a clutch temperature.

2. The transmission of claim 1, wherein the controller is configured to increase fan speed when the clutch temperature exceeds a predetermined threshold.

3. The transmission of claim 2, wherein the controller is configured to send a warning signal to a user interface when the clutch temperature exceeds another predetermined threshold.

4. The transmission of claim 1, wherein the controller is configured to decrease fan speed when the clutch temperature falls below a predetermined threshold.

5. The transmission of claim 1, further comprising:
a divider plate included in the clutch assembly having a plurality of airfoil ribs formed on a surface of the plate.

6. The transmission of claim 5, wherein a leading edge of at least one of the airfoil ribs is aligned with a relative vector equal to the sum of an air speed vector and a clutch speed vector.

7. A dry-clutch transmission, comprising:
a clutch assembly; and
a divider plate included in the clutch assembly having a plurality of airfoil Ribs formed on a surface of the plate;
wherein a leading edge of at least one of the airfoil ribs is aligned within 60 degrees of a relative vector equal to the sum of an air speed vector and a clutch speed vector.

* * * * *